Figure 1A:
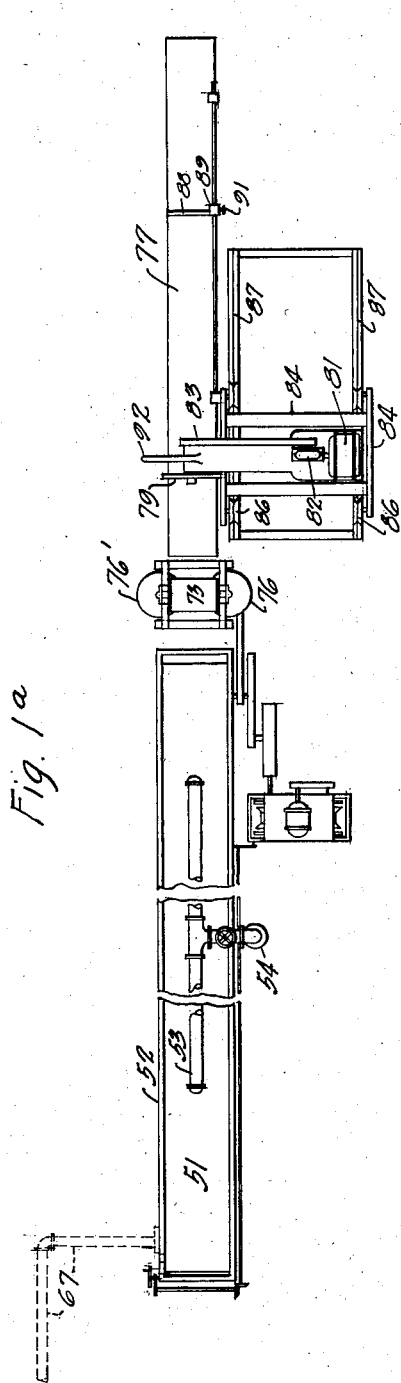

Aug. 18, 1936.  H. L. ROGERS  2,051,532
PREFORMED PRODUCT AND METHOD OF MAKING SAME
Filed March 26, 1931  2 Sheets-Sheet 1
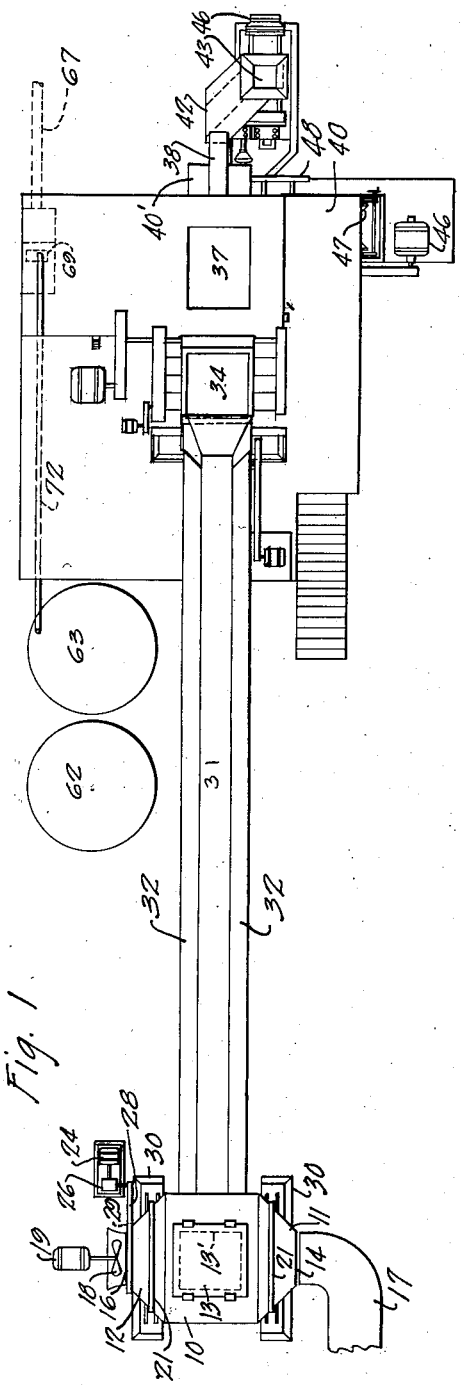
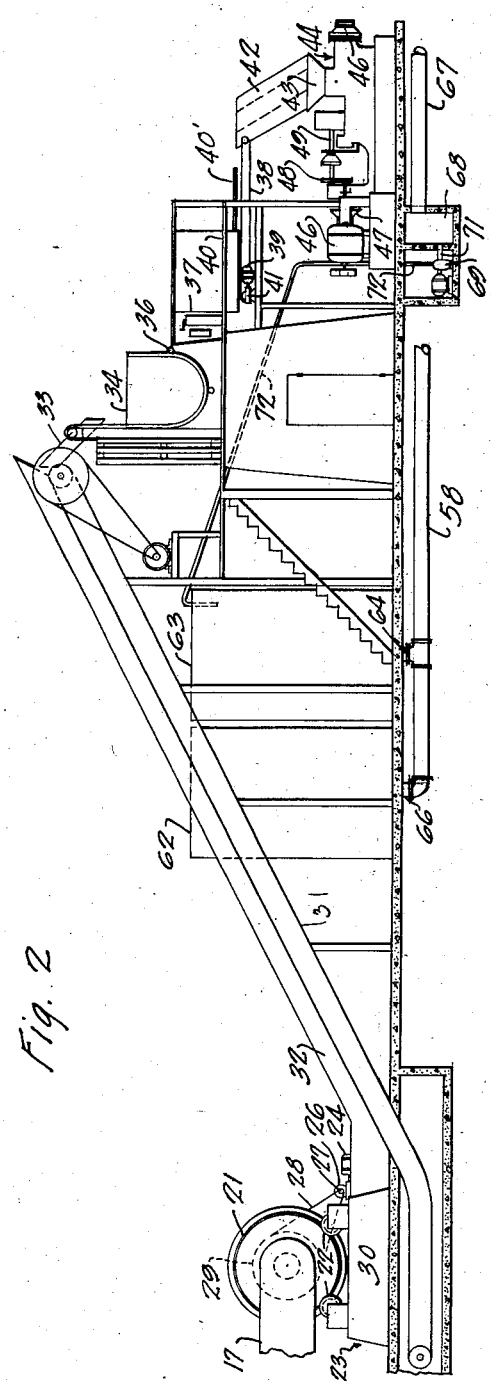
INVENTOR
HOMER L. ROGERS
ATT'YS Aug. 18, 1936.    H. L. ROGERS    2,051,532
PREFORMED PRODUCT AND METHOD OF MAKING SAME
Filed March 26, 1931    2 Sheets-Sheet 2

INVENTOR
HOMER L. ROGERS
by Roberts, Cushman & Woodbury
ATTYS

Patented Aug. 18, 1936

2,051,532

UNITED STATES PATENT OFFICE 2,051,532

PREFORMED PRODUCT AND METHOD OF MAKING SAME

Homer L. Rogers, Dayton, Ohio, assignor to Johns-Manville Corporation, New York, N. Y., a corporation of New York Application March 26, 1931, Serial No. 525,372

2 Claims. (Cl. 106—31)

This invention relates to a method of manufacture of and to preformed or premolded products of bituminous or asphaltic compositions, having properties which render them suitable for various structural uses, as for flooring, bridge planking, fence posts, and the like. The purposes for which these products may be employed are limited by the properties required for different applications or installations thereof. In some cases the product must be resistant to heat and yet non-brittle at relatively low temperatures. Tensile strength as well as toughness and stability are frequently important. It is highly desirable that these products should to some appreciable extent at least be resilient and flexible and capable of distortion or bending without undergoing permanent deformation. For some purposes the products must be capable of withstanding repeated impacts or live loads such as those to which bridge flooring is subjected. Moreover the utility of a preformed product is considerably increased when its composition is such that a nail for example may be driven into or through the same, especially at relatively low temperatures. In many instances the weight must be maintained at a minimum without sacrificing other desirable properties. Furthermore the manufacturing processes have heretofore been rather expensive to carry out due largely to excessive wear of apparatus for forming the products as well as to the difficulty of working the mix.

Objects of the present invention are to provide a product of the class described which is free from the usual objectionable features and which possesses various desirable properties such as those just mentioned; to improve the art of making products of this kind; to improve the workability of the mix from which the products are formed; and also to improve the composition of products of this class so as to reduce the wear on forming apparatus as well as to reduce the power required for such operations.

Figure 2A:
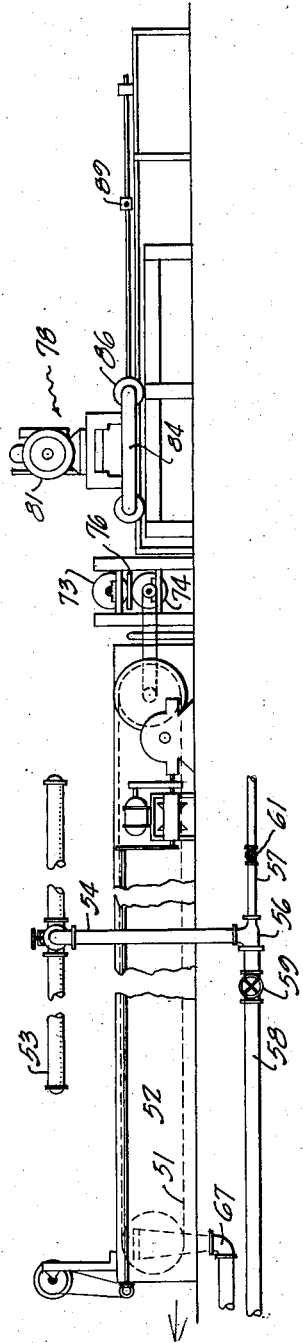

In the drawings:

Figs. 1 and 1ª when taken together in end-to-end relation constitute a diagrammatic plan view of apparatus for making a preformed product; and Figs. 2 and 2ª, when similarly arranged are a diagrammatic side elevation of the apparatus shown in Figs. 1 and 1ª.

In accordance with the present invention, the principal ingredients of a composition of this general class may comprise bitumen or asphalt, a mineral or organic filler and a binder, preferably of dry fiber, such as wood fiber, rag fiber, burlap fuzz, cocoanut, sisal, tampico or similar fiber having good tensile strength. These products may be made from virgin materials or from asphalt roofing scrap for example to which an appropriate amount of dry fiber may be added should the latter be desired. In many products of this general character the property of hardness, in the sense in which that term is used to describe sheet asphalt or other bituminous pavements, is not so important as it is that the product should have toughness and stability and be form retaining. Efforts have been made to produce asphalt bridge planking, for example, containing high percentages of mineral matter for the purpose of obtaining hardness in the sense that this term is used in describing sheet asphalt, but these efforts have been unsuccessful because it is impractical to introduce into a fibrous, bituminous mass sufficient mineral filler to obtain contact between the mineral particles. The mineral filler in all types of asphalt plank, which is representative of products of this general class, is in suspension and the traffic supporting ability of the plank does not depend primarily upon mineral matter. In sheet asphalt the mineral filler supports the load, for the mineral particles are in contact, the interstices between the mineral particles being filled with bitumen which acts as a binder for the mass. The use of a large amount of mineral filler in a bridge plank or similar preformed product causes the plank to be brittle so that it is difficult to drive nails through it without splitting the plank, particularly along the edges thereof. In some instances such planks tend to crack and disintegrate under traffic and it will be apparent that a brittle plank of this type is very difficult to handle and to apply. In preformed products in accordance with this invention the bitumen or asphalt is reinforced with fiber and the performance of such products is due to some extent to the presence of fiber in the composition. A finely divided mineral filler of a cellular nature, such as diatomaceous earth, may be used without fear of destroying the fibrous nature of the premoulded material and adversely affecting strength and brittleness. Furthermore, if the filler is of an absorbent nature it will tend to increase the melting point of the asphalt and thereby render it less susceptible to temperature changes. It has been found that diatomaceous earth is admirably suited to function as a filler for products of this kind.

In general any diatomaceous earth will improve the character of the product. Typically celite is preferable as this earth.

While the primary action of Celite in bituminous mixtures is essentially the same as that of any mineral filler, yet because of its peculiar structure Celite shows a larger volume for a given weight and has a considerably greater surface area than the ordinary round-particled filler. The action of Celite and other chemically inactive mineral fillers is directly related to the area of the surface presented to the bitumen, and is merely a wetting of the filler by the bitumen. The thinner the film of bitumen, the less flow there will be as the temperature increases. In the Celite mixture the bitumen is distributed over a larger area of the filler than in the case of a round-particled filler of equal weight and smaller volume, thereby reducing the film thickness of the bitumen and subsequently decreasing the liability to flow. As the melting point of a bitumen filler mixture depends upon the readiness with which it will flow it will be seen that the Celite mixture will have a higher melting point. An important advantage derived from the use of Celite in such mixtures as preformed planks, battery boxes and the like, is that less weight of material is required to produce the stabilization desired. Reduction of weight is of considerable importance, particularly in bridge flooring since asphalt plank for example involves a considerable tonnage and there is a material saving in freight, but of still greater importance is the reduction of the dead load on the bridge. Due to its porous cellular structure Celite also gives added mechanical protection to the bitumen, rendering it opaque to the disintegrating light rays. Celite because of its structure presents a considerably larger surface as a protector and hence proves more desirable when considered on an equal weight basis.

Other advantages of Celite in premolded asphalt are its low apparent density, chemical purity, high absorptive capacity, and comparatively large surface area. In all of these respects Celite differs from ordinary inorganic fillers including most other commercial diatomaceous earths. These particular properties of Celite are attributed to the heterogeneity of diatom forms, the absence of any large amount of clay or crystal impurities and to the open cellular structure of the individual diatom particles making up the whole. This highly porous cellular structure accounts for the high absorptive nature of Celite and together with the particle size distribution of the powder, accounts for its light weight. Celite particles are anisotropic in form, the individual particles varying from long needle-like bodies to flat disk-shaped forms with many intermediate shapes. The size of these various forms differs considerably and the net result of the mixture of these variously shaped and sized particles is comparable to the structure of a highly porous, light weight fibrous mass. Since the individual particles of Celite are all of microscopic size, it can readily be seen that the surface area must be enormous; in fact the specific surface is of a very high order of magnitude. Without attempting to correlate completely the physical properties of diatomaceous earths with their value in asphaltic or bituminous compositions it may be said in general that light weight and porosity are an advantage and that a dense compacted earth made up of small cylindrical diatoms is inferior to a light fluffy earth composed of larger and more spicular forms.

In the manufacture of preformed or premolded products asphalt roofing scrap or any asphalt and fiber mixture are partially masticated and the desired percentage of finely divided fossiliferous filler or diatomaceous earth, preferably Celite is added and thoroughly distributed throughout the mass. It has been found that the use of an excessive amount of fine mineral filler of the non-cellular types, such as talc, fine sand and similar finely divided materials tends to reduce the mechanical strength of the product. The Celite powder or other finely divided cellular filler is substituted for all or at least a portion of the finely divided non-cellular materials as heretofore used in products of this character, but coarser mineral, such as particles of slate, limestone and/or ground cinders may be used. For a general classification, those fillers which are retained by a 48-mesh screen may be classed as coarse fillers and those which pass through this screen may be considered the finely divided fillers, although, of course, it will be understood that this line of demarcation is merely an approximate arbitrary value which may be varied considerably and is given here only for the purpose of pointing out in general the relative grades which are to be selected. Preferably the ratio of coarse mineral filler to fine fossiliferous or cellular filler is maintained at a ratio of at least 1 to 1, but here again it will be understood that satisfactory products may be obtained even though this ratio is varied considerably. Entirely satisfactory products may be and in fact have been obtained with as little as 5% Celite but preferably the percentage of this material should be approximately 6 to 7 or 7½% with 92½% to 94% asphalt roofing scrap, although only 70% or even less of the latter material may be used for there is a great degree of latitude in formulas for products of this character. The asphalt roofing scrap may be of a variety of types of this material which is obtainable from various roofing manufacturers. It consists of asphalt saturated rag felt, asphalt saturated and asphalt coated rag felt and asphalt saturated, asphalt coated and mineral surfaced rag felt. Any one, or a combination of all, or of any two of the kinds described may be used. For the roofing scrap equivalent quantities of asphalt, and fiber or asphalt, mineral and fiber may be used should the product be made entirely from virgin materials. The amount of asphalt of bitumen in these products may vary from around 35 to approximately 60%, and for bridge flooring very good results are obtained from a mixture approximately 53% bitumen, 17% organic fiber, 19% coarse mineral and 11% fine mineral.

Apparatus for manufacturing this material as shown in the drawings may comprise a preheater in the form of a rotary cylinder 10 having cone-shaped ends 11 and 12. This cylinder has in its side wall, a charging opening 13' which is closed by a removable closure member 13. The ends of the cylinder are open at 14 and 16. For the purpose of heating material in this preheater there is provided a duct 17 which registers with the opening 14, and a means for producing a forced draught through the cylinder comprising, in the present instance, a fan 18 adapted to be driven by a motor or the like 19 is arranged adjacent the opening 16 at the opposite end of the cylinder. The conical ends of this cylinder are provided with circumferential tracks or rails 21, which rest upon spaced rollers 22 mounted upon the foundation structure 23. For rotating the cylinder there is provided an individual drive unit comprising an electric motor 24, which is connected to a speed-reducing mechanism 26. The latter operates a driving pulley 27 and a belt 28 is trained around the driving pulley and around a pulley 29 on the conical end of the cylinder. The foundation structure 23 is preferably in the form of transverse blocks or supports 30, which extend only under the end portions of the cylinder.

An endless conveyor belt 31 is arranged to operate under the intermediate portion of the cylinder between the supports 30. This traveling conveyor also operates upwardly in an inclined direction as shown in Fig. 2, and is equipped with sideboards 32 for guiding material thereon. A chute 33 is arranged for receiving material from the upper end of the conveyor and for directing this material into a steam-jacketed masticator and mixer 34. This mixer is mounted to pivot at 36, so that the contents thereof may be discharged into a steam-jacketed hopper 37. This hopper is provided with a removable closure member or door (not shown) in the lower portion thereof, so that the contents of the hopper may be discharged as desired upon a traveling belt or conveyor 38, which is adapted to be driven by an individual drive unit comprising a driving motor 39, and speed-reducing mechanism 41. Platforms 40 and 40' are provided for use by attendants. A chute 42 is positioned to receive material from the end of the conveyor 38, and is inclined downwardly to discharge such material into the hopper 43 of an extruding machine indicated generally at 44, so that the extrusion is made promptly.

This extruding machine is in the form of a standard pug mill used in the clay industry, having a spiral screw or auger, which operates in a cylinder to force material from the hopper through a die. The extruder is driven at variable speeds by means of an apparatus comprising a driving motor 46 and variable speed mechanism preferably a Reeves drive 47 and a mechanical drive 48 for transmitting power to a driven shaft 49, which operates through mechanism (not shown) to actuate the auger of the machine. Variable speed is highly desirable for extruding products of different sizes, as planking of different cross-sections. The extruder is also equipped with a steam-jacketed forming die 46, which is of the proper configuration to give the desired contour to products being extruded therethrough. The steam-heated die prevents gumming of asphalt at the die opening.

An endless conveyor 51 (Figs. 1ª and 2ª) is disposed in a cooling tank 52 and arranged to receive extruded products issuing from the die of the extruder. A perforated spray pipe 53 is disposed longitudinally above the conveyor for discharging a spray of water or other cooling fluid upon the products carried thereby. As shown in the drawings this spray pipe is supplied with cooling water from a connection 54, which is connected by means of a T 56 with supply pipes 57 and 58. Preferably valves 59 and 61 are interposed in these pipes adjacent to the T. The pipe 57 is connected to the city water supply system or other source of pressure supply. The pipe 58 is connected to water supply tanks 62 and 63 by means of connections 64 and 66. A discharge connection 67 extends through the cooling tank 52 to a point near the preferred water level thereof, and is adapted to discharge water from this tank to the well or sump 68. A suitable pump, such as the centrifugal pump 69, has its inlet 71 connected to the sump 68, and its discharge connection 72 arranged to convey water to one of the tanks as to the tank 63, as shown.

At the discharge end of the conveyor 51, adjustable upper and lower cylindrical calendar rolls 73 and 74 are arranged to receive a preformed product, as an extruded column and to reduce it to the proper size. Adjustable disks 76, 76' are arranged to engage the side walls of a column at this point to cooperate with the calender rolls in ironing out the irregularities in the surface of the column, and also in reducing it, so as to overcome any tendency of the column to swell after release of the pressure developed in the extruding machine.

A receiving table 77 is arranged to receive extruded products from the calender rolls. A traveling cut-off saw 78 is mounted for movement longitudinally of this table. This saw is preferably in the form of a rotary cutter 79 which is operated by a driving motor 81, acting through speed change mechanism 82, to operate a belt or the like 83 which is trained over a pulley fast on the shaft on which the rotary cutter is mounted. This mechanism is mounted upon a carriage 84, which is provided with supporting wheels 86 operating on tracks 87, extending substantially parallel to a direction of motion of products discharged by the calender rolls. An adjustable abutment or stop 88 is mounted upon a fixed rod 89 and adapted to be secured in different positions longitudinally thereof by means of a set screw 91. This stop is positioned to engage the end of a column or other product to determine the length at which it is to be cut by the saw. The carriage 84 of the saw may be provided with a handle 92 by which this carriage may be moved manually along the tracks 87.

In operation of the apparatus, roofing scrap or equivalent quantities of virgin materials may be fed in measured quantities into the preheater 10 through the charging opening 13' in the side wall thereof, where it is heated and partially broken up, heat being supplied from air drawn through the duct 17 from the stack or other source of hot air. The temperature of the stock is raised from 40 to 50° above atmosphere in this preheater. The preheated stock is then discharged onto the conveyor 31 by removing the door 13 from the side wall. The belt conveyor carries the stock to the chute 33, which discharges it into the mixer and masticator 34. As the stock is delivered into this mixer powdered fossiliferous material, preferably Celite is added in quantities closely approximating the amount required to produce the desired composition and the temperature of the masticated stock is raised to 150° F. to 300° F., preferably to approximately 250° F. The stock remains in this mixer until it is reduced to finely divided particles, that is, to a condition in which the felt or other binder has been torn apart, or fiberized, and intimately mixed with the mineral matter and asphalt. In this condition the heated mass tends to stick or cling together and is in such form that it would not readily discharge from the tank of the mixer as this tank is elevated to a vertical or slightly greater position.

In order to facilitate the discharge of this material from the mixer, a slight additional charge of Celite is added to cause the mass to break up into balls, in which condition it is readily discharged into the capacity hopper by causing the mixer to swing about its pivotal axis 36. The remnants of the mix may be pulled out of the mixer by hoe or similar tool, should this be necessary. The temperature of the stock is maintained from 150° to 300° F., preferably at substantially 200° F. in the capacity hopper, the stock being raked or otherwise removed from this hopper, as desired, onto the conveyor 38, which discharges the stock into the chute 42 of the extruding machine.

As a column, for example, is formed by this machine, it is received by the submerged conveyor 51 which carries it under the water sprays provided by the spray pipe 53, and also partially submerges the column in the water of the tank 52. The sprays and submergence rapidly chill the column while it travels the length of the tank. Upon reaching the end of the tank, the product passes through the calender rolls 73, 74 and between the disks 76, 76', all of which are adjusted to provide any given cross section. After passing through these rolls, the product passes onto the table 77, where it is cut to desired lengths by the rotary cutter 78. Following this, the products, such as planks or slabs, are dusted with sand, talc, or other non-adhesive agents, thereby completing the manufacturing operation.

The effect of Celite on a fibrous bituminous composition is to cause a hardening of the product. Immediately after manufacture there is free asphalt in excess of that absorbed upon the fibres or, superficially, upon the Celite and minute light colored particles or pockets of Celite may be seen in the mass, but in the course of a few weeks these disappear, indicating that the Celite is absorbing asphalt. About a week after manufacture these small pockets of Celite change in color from practically white to a deep yellow. This change continues until at the end of approximately 30 days it is impossible to detect the small pockets of Celite and the composition is jet black throughout its entirety indicating that the Celite has absorbed a considerable amount of oil. Further proof that such is the case is found in the fact that a product 90 days old is considerably tougher than when first manufactured.

The absorption of oil by Celite is an important factor in products of this kind, particularly where the raw material consists of asphalt roofing or shingle scrap which contains an excessive amount of asphalt. Diatomaceous earths in general and specifically Celite are effective to reduce the amount of free asphalt in the mixture and cause the product to become more resistant to heat, more stable and less brittle. Celite also dries the mix so that the surface of an extruded product is rough and as practically all of the free oil is absorbed the surfaces of these products are not sticky as heretofore but are sensibly dry even in warm weather. Furthermore these planks may be nailed at temperatures as low as 32° F. which meets all practical requirements and makes it possible to apply planks or the like during the winter season. It will be seen that this is a decided advantage when it is realized that previous products of this character can not be nailed without splitting at temperatures below approximately 50° F.

Abutting portions of these products, as the side walls of adjacent bridge planks, coalesce thus forming a water tight surface. It has been found that this composition coalesces far more rapidly than asphalt plank produced with other fillers and in fact after about 90 days traffic during warm weather the joints between the slabs usually disappear. Practical experience has proved that the use of Celite in asphalt plank for instance produces a tougher material, less susceptible to temperature changes, and which is less brittle at low temperatures and which marks under various objects such as horse shoes, tractor treads, etc., to no objectionable degree. Asphalt plank when made in accordance with this invention is particularly suitable for bridge flooring as it fills a need for a material that will accommodate itself to constant vibration and movement, will not corrugate and will knit and heal under traffic, as this product has the ability to recover its shape after it is dented.

In addition to improving quality of the product Celite or other diatomaceous earth having diatoms of typically spherical or ovoid shape or with rounded or pointed ends as previously pointed out, when used as a filler has a beneficial effect upon the manufacturing procedure. The pressure and friction exerted by an extruding machine upon this mixture is sufficient to raise the temperature 40 or 50°, frequently higher. There is less tendency for the mix to heat up when Celite is used as a filler than when limestone, talc or cinders are used. Celite increases the workability of the mix in an extruding machine and in addition causes less wear than heavier and coarser mineral matter and makes it possible to perform the necessary forming or molding operations with less power. These advantages are undoubtedly due to the peculiar structure of Celite itself as well as to its behavior in the mix. As previously pointed out the Celite particles present rounded or curved surfaces to the forming die and thus engage the latter with less friction than other diatomaceous earths. The peculiar porous cellular structure tends to facilitate flow of the relatively thin film of bitumen and thus improves the workability of the mix, so that less power is required to extrude or otherwise work the material.

It should be understood that the present disclosure is for the purpose of illustration only and that this invention includes all modifications and equivalents which fall within the scope of the appended claims.

I claim:

1. The method of making a preformed unit which comprises mixing bituminous material and fibrous reenforcement therefor at an elevated temperature until the resulting mass is partially broken up, then adding finely divided diatomaceous earth in amount corresponding to approximately 5 to 7% of the said mass, continuing the mixing until the resulting product is formed partly into balls, promptly extruding the resulting balled-up mixture, and then causing the diatomaceous earth to become saturated with the said bituminous material, whereby the stiffness of the mass at a given temperature is increased subsequent to the extrusion.

2. A preformed flooring plank comprising a compressed mass including a large proportion of bituminous material of the type of asphalt, reenforcing fibers dispersed throughout the said bituminous material, and admixed finely divided diatomaceous earth in the proportion of approximately 5 to 7 parts by weight to 100 parts of total weight, the diatomaceous earth serving to absorb excess free oil and causing the plank to be tough and form-retaining at elevated temperatures but not brittle at low temperatures.

HOMER L. ROGERS.